(12) United States Patent
Batten (10) Patent No.: US 12,197,218 B2
(45) Date of Patent: Jan. 14, 2025

(54) SYSTEM AND A METHOD FOR CONTROLLING ROTORCRAFT ROTORS

(71) Applicant: Hyper Q Aerospace Holdings Pty Ltd, Bargo (AU)

(72) Inventor: Peter Batten, Bargo (AU)

(73) Assignee: Hyper Q Aerospace Holdings Pty Ltd, Bargo (AU)

( * ) Notice: Subject to any disclaimer, the term of this patent is extended or adjusted under 35 U.S.C. 154(b) by 158 days.

(21) Appl. No.: 17/600,425

(22) PCT Filed: Apr. 6, 2020

(86) PCT No.: PCT/AU2020/050347
§ 371 (c)(1),
(2) Date: Sep. 30, 2021

(87) PCT Pub. No.: WO2020/198814
PCT Pub. Date: Oct. 8, 2020

(65) Prior Publication Data
US 2022/0221864 A1  Jul. 14, 2022

(30) Foreign Application Priority Data

Apr. 4, 2019  (AU) ............................. 2019901157

(51) Int. Cl.
*G05D 1/00* (2024.01)
*B64C 27/82* (2006.01)
(Continued)

(52) U.S. Cl.
CPC ........... *G05D 1/0204* (2013.01); *B64C 27/82* (2013.01); *G05B 13/024* (2013.01);
(Continued)

(58) Field of Classification Search
CPC .... G05D 1/0204; G05D 1/0858; B64C 27/10; B64C 27/82; B64C 2027/8245;
(Continued)

(56) References Cited

U.S. PATENT DOCUMENTS 2,676,771 A * 4/1954 Mayo .................... B64C 35/005
244/102 R
8,931,732 B2 1/2015 Sirohi et al.
(Continued)

FOREIGN PATENT DOCUMENTS

WO  WO 2016/054220 A1  4/2016

OTHER PUBLICATIONS

PCT International Search Report and Written Opinion, PCT Application No. PCT/AU2020/050347, Jun. 2, 2020, 13 pages.

*Primary Examiner* — Ian Jen
(74) *Attorney, Agent, or Firm* — WTA Patents (57) ABSTRACT

The present disclosure is directed to a method for controlling rotors of a rotorcraft system comprising the steps of: receiving air velocity data, first and second rotors rotational angular velocity data, external air temperature data and rotorcraft altitude data by the control module; calculating air velocity over the plurality of blades based on the received data using the control module; calculating, based on the calculated air velocity, if one or more retreating blades of one of the first and second counterrotating rotors are generating insufficient lift; and sending one or more actuation signals from the control module to the electric motor and/or actuators of the other of the first and second counterrotating rotors to maintain a predetermined amount of lift.

18 Claims, 6 Drawing Sheets

(51) Int. Cl.
*G05B 13/02* (2006.01)
*B64C 27/10* (2023.01)

(52) U.S. Cl.
CPC ............ *G05D 1/0858* (2013.01); *B64C 27/10* (2013.01); *B64C 2027/8245* (2013.01)

(58) Field of Classification Search
CPC ....... B64C 11/308; B64C 11/44; B64C 27/80; B64C 27/22; B64C 2027/8236; B64C 2027/8209; B64C 2027/8227; G05B 13/024; G05B 21/02; B64D 27/24
See application file for complete search history.

(56) References Cited

U.S. PATENT DOCUMENTS

| | | | |
|---|---|---|---|
| 9,199,729 B1 | 12/2015 | Uebori et al. | |
| 9,248,909 B2* | 2/2016 | Eller | B64C 27/80 |
| 2014/0314563 A1 | 10/2014 | Mayrides et al. | |
| 2015/0028597 A1* | 1/2015 | Eller | B64C 27/10 |
| | | | 290/1 A |
| 2017/0233068 A1* | 8/2017 | Eller | B64D 35/06 |
| | | | 701/3 |

* cited by examiner

SYSTEM AND A METHOD FOR CONTROLLING ROTORCRAFT ROTORS

TECHNICAL FIELD

The present technology relates to a system and a method for controlling the rotors of a rotorcraft to provide lift and thrust.

BACKGROUND

Rotorcrafts or rotary-wing aircrafts having rotor blades for producing lift and thrust are known. As a rotorcraft begins to move horizontally, a rotor blade travelling in the same direction as the rotorcraft is known as an advancing blade and a rotor blade travelling in the opposite direction to the rotorcraft is known as a retreating blade.

During operation, rotorcraft rotor blades spin about a rotor shaft at a typically constant speed $\Omega_R$ (usually measured in RPM). In coaxial helicopters, multiple rotor disks rotate in opposite directions about a central axis.

In single rotor rotorcrafts, when the rotorcraft has no vertical velocity, lift is generated uniformly across the rotor disks as the blades pass through the air. If the rotorcraft blades are subject to a relative wind (usually induced by the forward velocity of the helicopter), more lift is generated on the advancing side of the rotor disk, and less lift is generated on the retreating side. This dissymmetry of lift shows a fundamental problem encountered by single-rotor helicopters. Coaxial helicopters amend this issue using counter-rotating disks.

To address dissymmetry of lift, helicopter rotor blades may rotate about three axes. The lead-lagging angle (angular position on the plane of the blades), the flapping angle (between the blade and the rotational axis) and the feathering angle, also known as angle of attack (AOA). These angles are managed to decrease lift on the advancing blades and increase lift on the retreating blades. The primary limitations of these measures are found in retreating blade stall and supersonic blade limitations.

The lift generated by a rotor blade is calculated by the lift equation for the rotor disk $$L = \tfrac{1}{2} C_L \rho V^2 S \qquad [1]$$

Where: $C_L$=Lift coefficient, which is dependent on the angle of attack (AOA) of a rotor blade (also referred herein as blade pitch angle);
A=wing area of the rotor blade (m²);
S=surface area of the wing blade, or propeller (m²);
c is the chord length;
$\rho$=air density (kg/m³); and
V=velocity of airflow over the rotor blade (m/s).

The lift generated by a rotor blade of a rotorcraft can be broken down into two components, a vertical component that counters gravity and a horizontal component that causes the rotorcraft to move horizontally and accelerate in a horizontal direction. It will be appreciated that increasing the velocity of air flowing over the rotor blade will increase the amount of lift generated by the rotor blade.

For any velocity of airflow over the rotor blade, there is a maximum AOA at which the rotor blade can be positioned before the rotor blade stalls and no longer produces any lift. This is known as the critical angle. It will be appreciated that the velocity of airflow over a rotor blade is greatest at the tip of the rotor blade and that the velocity of airflow over the rotor blade at any given point is dependent on the revolutions per minute (RPM) of the rotor blade and the distance from the centre of the rotor hub.

When a rotorcraft moves horizontally, the velocity of airflow over an advancing rotor blade is greater than the velocity of airflow over a retreating rotor blade. So that the advancing rotor blade and the retreating rotor blade generate about the same lift, the AOA of the advancing rotor blade is usually decreased, and the AOA of the retreating rotor blade is usually increased.

As the air velocity of the rotorcraft increases and the RPM of the rotor is maintained constant, the velocity of airflow over the retreating rotor blade decreases. The reduction of airflow over the retreating rotor blade will cause the retreating rotor blade to approach the critical angle. As the air velocity of the rotorcraft increases further and the RPM of the rotor is maintained constant, the retreating rotor blade will eventually exceed the critical angle and stall, thereby causing the rotorcraft to become unstable and possible loss of control of the rotorcraft may occur. This phenomenon is known as retreating blade stall (RBS). Accordingly, it will be appreciated that RBS is one factor that limits the maximum air velocity of the rotorcraft.

Critical Mach number ($M_{CRIT}$) is a limiting velocity below which no part of the rotorcraft exceeds the velocity of sound. The addition of the angular velocity of the rotor blade and the velocity of the rotorcraft can result in the airflow over the outer ends of the advancing rotor blade approaching transonic velocity. Transonic and supersonic airflow over the rotor blades can be detrimental for the rotorcraft. Transonic and supersonic airflow occurs on a rotor blade when the velocity of the rotor blade at any point along the rotor blade approaches or exceeds the local velocity of sound. However, even when the velocity at a given point along a rotor blade is less than the velocity of sound, the camber of the rotor blade may cause nearby air to accelerate to supersonic velocity. At transonic and supersonic velocity, the centre of lift of the rotor blade moves rapidly towards the trailing edge of the rotor blade and disturbed airflow occurs, causing the rotor blade to become inefficient, which may cause damage to the rotor blade and/or the rotorcraft. Accordingly, it will be appreciated that transonic and supersonic airflow over the rotor blades is another factor that limits the maximum air velocity of the rotorcraft.

In order to avoid RBS and transonic and supersonic airflow over the rotor blades, the maximum air velocity of conventional rotorcraft is limited. This maximum velocity is determined by the length of the rotor blades and the RPM of the rotor. For example, a 3 metre (m) rotor blade rotating at 600 RPM will have a tip velocity of approximately 190 m/s or 370 nautical miles per hour (nm/hr). If the rotorcraft is flying at an air velocity of 100 nm/hr, the tips of the rotor blades will reach velocity of 470 nm/hr. Supersonic airflow at sea level in a standard atmosphere is approximately 660 nm/hr. Accordingly, a rotorcraft having 3 m rotor blades rotating at 600 RPM will have a theoretical maximum air velocity of approximately 290 nm/hr.

It will be appreciated that other effects such as, for example, air density, temperature, altitude, buffet margin, wind, and the like may have a negative impact on the maximum air velocity of the rotorcraft. The camber of the rotor blades must also be considered, as local particles of air will accelerate across the rotor blades as the rotor blades pass through the air.

SUMMARY

To further understand the factors limiting the maximum velocity of rotorcrafts, the Inventors used a modified lift equation to allow calculation of lift for blades retreating at high velocity. This is done by expressing the v term in the lift equation as v|v|. By modelling the velocity in the lift equation using a linear equation as a function of the relative wind speed and the blade azimuth angle and integrating the lift equation along the blade, the Inventors calculated the lift coefficient $C_L$ required to maintain zero vertical velocity as a function of time. Using this approach, the inventors found that traditional helicopters cannot exceed v/3 of about 114.3 ms$^{-1}$. This limit is slightly higher than the known world speed record of about 111 ms$^{-1}$ by the Westland Lynx set in 1986.

Embodiments of the invention are directed to improving rotorcraft maximum air velocity through a rotorcraft lift and thrust system that uses precise control of rotorcraft rotor angular velocity and blade angle of attack enabled by one or more electronically controlled electric motors and a plurality of actuators.

In accordance with the first aspect, the present invention provides a coaxial rotorcraft system comprising:
first and second counter-rotating rotors, each having a plurality of blades for generating lift when rotating;
one or more electronically controlled electric motors operatively coupled to the first and second rotors;
a plurality of electronically controlled actuators, each actuator operatively coupled to one or more of the plurality of blades and arranged to control the angle of attack of the one or more of the plurality of blades;
a control module arranged to:
receive rotorcraft air velocity data,
first and second rotors angular velocity data,
external air temperature data and rotorcraft altitude data;
calculate air velocity over the plurality of blades;
continuously analyse the received data; and generate, based on the analysed data, one or more actuation signals to control the one or more electric motors and/or the actuators in a manner such that a predetermined lift is maintained when the plurality of blades are rotating.

In an embodiment, the system comprises one or more rotor hubs, directly coupled to the one or more electronically controlled electric motors and the first and second rotors.

In an embodiment, the system comprises a plurality of sensors on-board the rotorcraft arranged to measure rotorcraft air velocity, first and second rotors angular velocity, external air temperature and rotorcraft altitude.

If insufficient lift is detected, the control module may calculate a lift deficiency E based on the formula:

$$E = L + [c\rho R(3u-v)(v^2 - 3vu + 3u^2)/6(v-u)]$$

u is the forward velocity of the rotorcraft,
c is the chord length of the blades,
ρ is the air density,
R is the blade radius,
v is the speed of the blade(s) tip of the rotors, limited by the speed of sound.

One or more actuation signals may be sent from the control module to the electric motors and/or actuators of the other one of the first and second counterrotating rotors to compensate for the insufficient lift In an embodiment, the one or more actuation signals control the one or more electric motors and/or the actuators in a manner such that thrust can be increased while lift is maintained.

In an embodiment, the angle of attack for each blade is controlled by one actuator operatively coupled to the blade.

In an embodiment, the system comprises one or more auxiliary thrusters and the control module is further arranged to generate at least one or more actuation signals for the one or more auxiliary thrusters to maintain, increase or decrease thrust when necessary or desired.

In an embodiment, the control module comprises a processing unit on-board the rotorcraft; the processing unit being connected to the plurality of sensors, the actuators and the electric motors via a high-speed communication link.

In an embodiment, the plurality of sensors is arranged so that rotorcraft air velocity data, first and second rotors angular velocity data, external air temperature data and rotorcraft altitude data are continuously streamed to the control module via the high-speed communication bus. The processing unit analyses the data and generates actuation signals which, in turn, are sent to the electric motors and/or the actuators in real-time.

In an embodiment, the control module comprises a memory unit operatively coupled to the processing unit; the memory unit comprising instructions suitable to calculate air velocity over the plurality of blades, based on rotorcraft air velocity data and first and second rotors angular velocity data.

In accordance with a second aspect, the present invention provides a method for controlling rotorcraft rotors of a rotorcraft system in accordance with the first aspect; the method comprising the steps of:
receiving air velocity data, first and second rotors rotational angular velocity data, external air temperature data and rotorcraft altitude data by the control module;
calculating air velocity over the plurality of blades based on the received data using the control module;
calculating, based on the calculated air velocity, if one or more retreating blades of one of the first and second counterrotating rotors are generating insufficient lift; and
sending one or more actuation signals from the control module to the electric motors and/or actuators of the other one of the first and second counterrotating rotors to compensate for the insufficient lift.

In an embodiment, the step of calculating if one or more retreating blades of one of the first and second counterrotating rotors are generating insufficient lift includes calculating a blade critical velocity. The blade critical velocity may be an advancing blade transonic or supersonic blade airflow velocity and the one or more actuation signals may comprise a control signal sent to the one or more electric motors to reduce rotor hub angular velocity and prevent advancing blade transonic or supersonic blade airflow while maintaining lift.

In an embodiment the method further comprises the step of calculating a lift deficiency E based on the formula:

$$E = L + [c\rho R(3u-v)(v^2 - 3vu + 3u^2)/6(v-u)]$$

In an embodiment, the step of sending one or more actuation signals from the control module to the electric motor and/or actuators of the other of the first and second counterrotating rotors to maintain lift is such that the reduction of angular velocity may be proportional to rotorcraft velocity and net resultant airflow to constrain the rotorcraft below a critical velocity ($M_{CRIT}$) in accordance with the following formula:

$$V_{Tip\ Velocity} + V_{Freestream} \approx Constant$$

where $V_{Freestream}$ is true airspeed in the direction of travel.

In an embodiment, the method further comprises the step of calculating a value of advance ratio for each blade in accordance with the following formula:

$$\mu = V_{Freestream}/\omega R$$

where $\omega$ is the rotor hub angular velocity, R is the blade length and $V_{Freestream}$ is true airspeed in the direction of travel, and monitoring the value of advance ratio and trigger a reduction of blade angle of attack prior to the advance ratio reaching 0.7.

The blade critical angle may be a blade angle of attack at which, for a given rotorcraft velocity, a retreating blade stalls and that the one or more actuation signals this may comprise, is directed to the one or more actuators to reduce blade angle of attack on the plurality of retreating blades in order to prevent the retreating blades from stalling.

In an embodiment, the method further comprises the step of calculating the net rotorcraft lift (L) in accordance with the following formula:

$$L = (C_L \tfrac{1}{2} \rho V^2 S)_{Blade\ 1} + \ldots + (C_L \tfrac{1}{2} \rho V^2 S)_{Blade\ n}$$

Furthermore, the net rotorcraft lift can be written to describe the advancing hemisphere blades and the retreating hemisphere blades $$L = L_{Advancing} + L_{Retreating}$$

The reduction of rotor hub angular velocity may be calculated in accordance with the following formula:

$$N_{r,Reduced} = N_r - V_{Freestream}/(2*\pi*R)/60$$

where $N_r$ = nominal angular velocity of the rotor hub.

In an embodiment, the blade angle of attack is calculated in accordance with the following formula:

Blade Angle (BA) = Blade Angle Longitudinal $(BA_{Lon})$ + Blade Angle Lateral $(BA_{Lat})$ − Blade Angle Reduction$_{retreating\ blade}$ In an embodiment, the one or more actuation signals comprise control signals for the plurality of electronically controlled actuators such that the blade pitch of the plurality of blades coupled to the first rotor hub and the blade pitch of the plurality of blades coupled to the second rotor hub are controlled in a reciprocal manner when the rotorcraft is in translational lift. The blades may be controlled so that the angle of attack of the advancing blades is increased to reduce lift imbalance when required.

In embodiments, when the rotorcraft is being manoeuvred, the blades of the first and second counter-rotating rotors are controlled so that, when an excessive lift imbalance is detected, for example when the pitch of advancing blades is excessive in relation to the pitch of retreating blades, the control module generates compensating control signals by increasing the angle of attack to the alternate advancing blades, thereby reducing lift imbalance.

In an embodiment, the method further comprises the step of controlling the rotors angular velocity and angle of attack of advancing blades to provide lift compensation in accordance with the following formula:

Lift Compensation$_{Rotor\ 1}$ = Lift lost from retreating blade due to AOA reduction$_{Rotor\ 2}$
+ Lift lost from retreating blade due $N_r$ reduction$_{Rotor\ 2}$
+ Lift lost from advancing blade due $N_r$ reduction$_{Rotor\ 2}$.

Lift Compensation$_{Rotor\ 2}$ = Lift lost from retreating blade due to AOA reduction$_{Rotor\ 1}$
+ Lift lost from retreating blade due $N_r$ reduction$_{Rotor\ 1}$
+ Lift lost from advancing blade due $N_r$ reduction$_{Rotor\ 1}$.

Blade Angle $(BA)_{Rotor\ 1}$ = Blade Angle Longitudinal $(BA_{Lon})$
+ Blade Angle Lateral $(BA_{Lat})$
+ Lift Compensation$_{advancing\ blade\ Rotor\ 2}$ Blade Angle $(BA)_{Rotor\ 2}$ = Blade Angle Longitudinal $(BA_{Lon})$
+ Blade Angle Lateral $(BA_{Lat})$
+ Lift Compensation$_{advancing\ blade\ Rotor\ 1}$ In an embodiment, the method further comprises the step of generating at least one or more actuation signals for one or more auxiliary thrusters to provide additional thrust to the rotorcraft when required.

In an embodiment, the method further comprises the step of accessing a library of known physical attributes of the plurality of blades and the rotorcraft.

In an embodiment, the method further comprises the step of measuring or calculating wind velocity to calculate blade air velocity.

In an embodiment, the method further comprises the step of detecting a vortex ring state condition and generating control signals directed to the one or more electric motors to provide a rapid increase in rotor angular velocity and control signals directed to the plurality of actuators to reduce blade angle of attack.

The control signals may be such that normal flight conditions are recovered in response to a detected vortex ring state condition by:

reducing blade angle of attack towards zero; and
rapidly increasing rotors angular velocity.

In embodiments, the configuration of the first and second counter-rotating rotors can accommodate even, odd, coprime or any other symmetrical or non-symmetrical distribution of rotor blades between each rotor disk. In addition the rotor blades on one rotor disk can support rotor blades of a different blade length between the first and second counter-rotating rotors.

In some embodiment, the method accounts for one or a combination of cyclic pitch; cyclic roll; yaw; collective; velocity; g-loading; density altitude; pressure altitude; static pressure; dynamic pressure; temperature; moisture; inertial measurement unit values; vibrational measurements and torque measurements, number of blades per rotor; number of tail rotors; number of auxiliary thrust devices; direction of blade rotation; length of blade; length of hub; length of blade grip; mass of blade; mass of hub; mass of blade grip; mass of actuators; total mass of rotorcraft; phase lag; advance angle; maximum pitch rate; maximum roll rate; maximum g-loading; minimum g-loading; maximum velocity; nominal rotor disk angular velocity; nominal tail rotor RPM; Retreating Blade Stall (RBS) angular velocity; RBS pitch reduction; and RBS lead angle.

Advantageous embodiments of the present invention provide real-time monitoring of rotorcraft critical parameters and active electronic control of rotor hub angular velocity and individual blade pitch to prevent the retreating blades from stalling while maintaining lift and allowing for increased thrust. In addition, embodiments allow mitigating flight issues related to advancing blade transonic or supersonic blade airflow, thereby allowing for increased rotorcraft maximum velocity.

In addition, the system allows mitigating adverse aerodynamic flight vulnerabilities such as vortex ring state (VRS) and settling with power. A combination of dynamic control of rotor hub angular velocity in synergy with individual control of blade angle of attack allows modifying the airflow over the rotor blade once VRS is detected.

Embodiments of the present invention allow for a simplified rotorcraft propulsion system. For example, the system provided in some embodiments does not require a mechanical swashplate, mechanical gearbox or drive train and therefore has a reduced mechanical complexity.

Prior art rotorcrafts must mechanically restrict higher rotor velocities to provide protection as the rotorcraft accelerates. An advantage of embodiments of the present invention is that it enables greater RPM at low horizontal velocities than can be permitted by conventional rotorcraft. Control of these high speed and RBS aerodynamic limitations may allow for higher weight of the rotorcraft at take-off.

BRIEF DESCRIPTION OF THE DRAWINGS

Preferred embodiments of the present invention will be described, by way of examples only, with reference to accompanying figures, wherein;

FIGS. (5b) and 5(c) show the lift coefficient and the difference between lift and drag against angle of attack and the average lift over the advancing half of the helicopter rotor disk against forward velocity for several angles of attack. FIG. 5 (d) shows the average lift over the retreating half of the helicopter rotor disk against forward velocity for different weights.

DETAILED DESCRIPTION OF EMBODIMENTS

Embodiments of the system and method disclosed herein mitigate blade supersonic airflow and RBS and permit rotorcraft operation at significantly higher velocity than conventional rotorcraft. Control of these aerodynamic limitations allows the rotorcraft to take off at higher weight as a greater RPM can be applied at low horizontal velocities with less concern for higher rotor velocities as the rotorcraft accelerates.

Conventional helicopters incorporate two mechanical systems that enable variations in rotor RPM and individual blade pitch angle control. These are the liquid fuel engine (gas turbine or internal combustion) with its associated transmission and the swashplate. Due to direct mechanical coupling from the transmission, any variation in main rotor RPM will cause a change in lift that will result in a climb or descent unless a change of blade AOA is applied. A change of RPM of the tail rotor will also cause a change in tail rotor thrust causing a yaw on the airframe unless compensating flight control input is applied. Operating the engine at a non-optimal velocity will also impact fuel flow and the capacity to manage rotor droop when the rotorcraft is subjected to aerodynamic loads such as applying incidence to the airframe.

Figure 1:
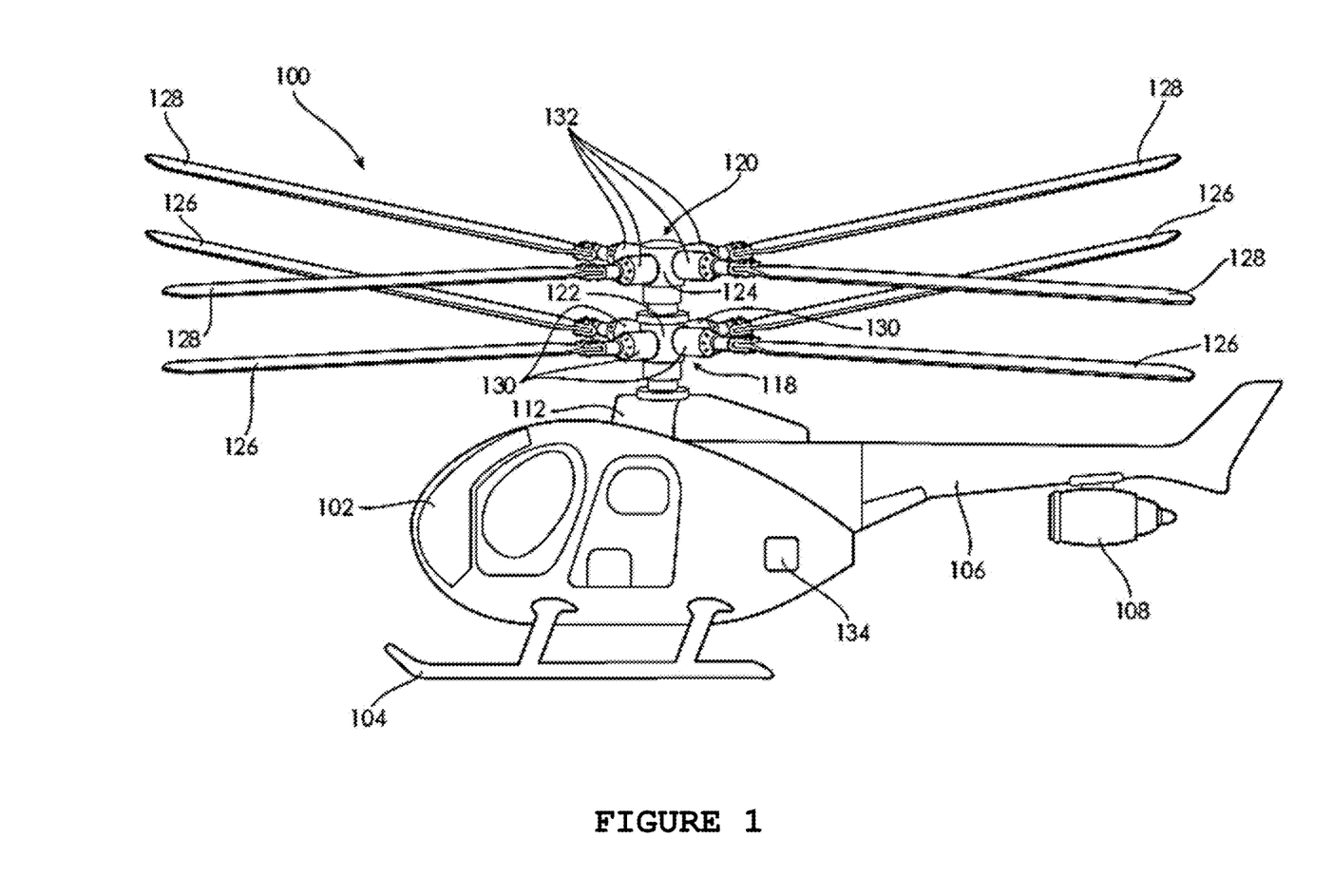
FIG. 1 is a schematic of a rotorcraft embedding a system in accordance with the invention.

Referring now to FIG. 1, there is shown a rotorcraft, in this example a helicopter 100 with a fuselage 102, landing skid 104, a tail section 106, an auxiliary thruster 108, and a rotorcraft lift and thrust system comprising: one or more electronically controlled electric motors 112 coupled to counter-rotating first and second rotors, lower rotor 118 and upper rotor 120, through rotor hubs 122, 124. The lower rotor 118 comprises a plurality of blades 126 coupled to rotor hub 122 and the upper rotor 120 comprises a plurality of blades 128. The counter-rotating lower rotor 118 and upper rotor 120 can be independently controlled by the one or more electric motors 112.

A plurality of electronically controlled actuators 130,132 are operatively coupled to the hubs 122, 124 and to the blades of the lower and upper rotors 126, 128 and are arranged to control blade pitch (or blade AOA). In the example of FIG. 1, each blade is controlled by a respective actuator, providing individual blade control (IBC).

A plurality of sensors (not shown) are located across the rotorcraft 100 and are arranged to measure rotorcraft air velocity, rotor hub angular velocity and other environmental parameters, such as external air temperature and rotorcraft altitude.

A control module 134 is located on-board the helicopter 100 and arranged to monitor velocity data received from the plurality of sensors, analyse the received data and generate at least one or more actuation signals. The control module, by using the received data, calculates air velocity over the plurality of blades; continuously analyse the received data; and generates, based on the analysis, one or more actuation signals to control the electric motors 112 and the actuators 130, 132 in a manner such that lift is maintained. In addition, actuation signals can be generated to increase thrust and effectively improve the maximum air velocity and payload of the helicopter 100.

Additional thrust can also be provided for the rotorcraft by auxiliary thruster 108 controlled by the control module 134.

A variable velocity mechanical gearbox has been used in the art to control main rotor RPM and tail rotor RPM (where fitted). However, in this disclosure one or more electrically controlled electric motors 112 are used to obtain precise RPM control. The electric motors 112 offer rapid response to signals received by the control module 134.

In the example described, high-velocity axial flux electric motors rotate the rotor hubs 122, 124. The motor is mounted directly adjacent to the rotor hubs 122, 124. The motors 112 are scalable and stackable enabling rapid power change by adding additional motors as needed. The motor used has: max RPM 1500, motor Length (mm) 60, mass (kg) 14.3, Nominal power 20-25 kW @1000 RPM, peak power 45 kW@1000 RPM, peak torque (Nm) 430 Nm, continuous Torque (Nm) 191 Nm@1000 RPM. Those skilled in the art will appreciate that alternative motors may be used in accordance with the invention.

By using electronic control of the blade AOA for each blade 126, 128, the control module 134 can implement a virtual swashplate that can substitute the conventional swashplate. The individual blade AOA is electronically controlled in real-time for each blade 126, 128. For retreating blades this will reduce the likelihood of RBS. For advancing blades, individual blade angle control will allow lift to be maintained, increased or decreased and allow for increased maximum air velocity.

The control module 134 can allow maintaining roughly the same airflow across the advancing rotor blades by adjusting rotor RPM commensurate with net resultant airflow over the helicopter 100. The faster the helicopter 100 flies the slower the RPM of the rotor hubs.

When the control module 134 calculates the reduction in RPM to maintain equilibrium, it considers the advancing hemisphere of the lower and upper rotors 118, 120, which is producing more lift, and the retreating hemisphere of the lower and upper rotors 118, 120, which is producing less lift.

Often when using a conventional swashplate design, the blade angle on the retreating blade will be higher than that of the advancing blade providing roughly the same amount of lift on the advancing side as is generated on the retreating side. This will ensure the helicopter remains in balanced flight.

Rotor RPM reduction will, however, cause retreating blades to approach the critical angle sooner. The control system 134 reduces the AOA accordingly on retreating blades to prevent retreating blades reaching the critical angle.

Blade pitch angle control is achieved by using electrically powered actuators 130, 132, which can be linear or rotary linear power transducers, actuators, torque motors or similar devices. Each rotor blade 126, 128 has at least one actuator, torque motor, servo device or similar device (electrical, hydraulic or pneumatic powered) configured to individually control blade pitch.

The actuators 130, 132 have a very fast cycling rate commensurate with the rotational RPM of the rotors 118, 120. For a 1200 RPM hub rotation the actuator operates at a frequency of 20 Hz. Each actuator is programmed to use variable throw (rotation or displacement) and variable rate to control different blade angle positions throughout each cycle or hub rotation. This allows different blade angles to be generated depending on the rotational position of the blades 126, 128. Advancing blades can have high angles of attack while retreating blades can have lower, zero or even negative AOA to prevent RBS. A force of about 90N is sufficient to rotate the blades 126, 128 in flight. The actuators 130, 132 can operate up to about 35 Hz. These actuators in conjunction with the axial flux drive motors will allow over velocity rotation of the rotor hub allowing much greater payload capacity.

To provide a simple understanding of the forces under consideration, the lift generated by the rotating blade can be resolved into two vectors. These are the vertical component which represents the lift to counter gravity and a horizontal component which represents thrust and is an accelerative force on the helicopter 100.

As a helicopter accelerates the velocity of air over an advancing rotor blade increases and the vertical component that is the lift generated increases. The retreating blade generates less lift as the velocity of air over these blades is less. The lift equation shows the velocity is a squared relationship so when the resultant lift for the advancing and for the retreating blade is combined the overall effect is an increase in lift as the rotorcraft increases velocity.

For existing helicopters, to keep the vertical component of lift in equilibrium so the helicopter does not climb, less lift from the rotor system as a whole is required. Blade AOA considered mostly as collective is therefore reduced.

Rather than allowing the increase in velocity to be the determinant of lift requiring a subsequent reduction in blade angle, the control module 134 reduces the RPM of the rotor hubs 122, 124 to values which maintain a similar net velocity of air over the blade. Assuming that the net airflow across the blade remains the same, the same amount of lift and thrust will be generated. Any desired increase in thrust or lift is achieved by increasing AOA primarily on advancing blades only. The control module 134 ensures that to ensure no transonic or supersonic airflow across the blade can occur.

$$V_{Tip\ Velocity} + V_{Rotorcraft} \approx \text{Constant}$$

Once RPM reduction has been applied, the advancing blade should not encounter high velocity blade effects. The faster the helicopter 100 flies the lower the RPM of the rotor hubs 122, 124. The resultant net airflow over the retreating blade will only ever be equal to or less than the net airflow over the retreating blade.

Approach to retreating blade critical angle can be further reduced or eliminated by reducing the AOA on the retreating blade. As the helicopter 100 accelerates the control module 134 will reduce the retreating blade angle toward zero (or lower due to blade twist) to completely eliminate RBS. Given that $L = C_L * \frac{1}{2} \rho V^2 S$ and knowing the performance lift drag curve for the blade, the number of degrees of retreating blade angle reduction is readily calculated.

Any loss of lift resulting from the reduction of RPM on the retreating blade on one rotor is applied to the other rotor by increasing the advancing blade angle to provide lift compensation.

As an alternative to that described in the net airflow method, lift compensation can also be achieved by holding RPM rotation higher and retreating blade angle below the critical angle hence generating additional lift on the advancing blades.

Figure 2:
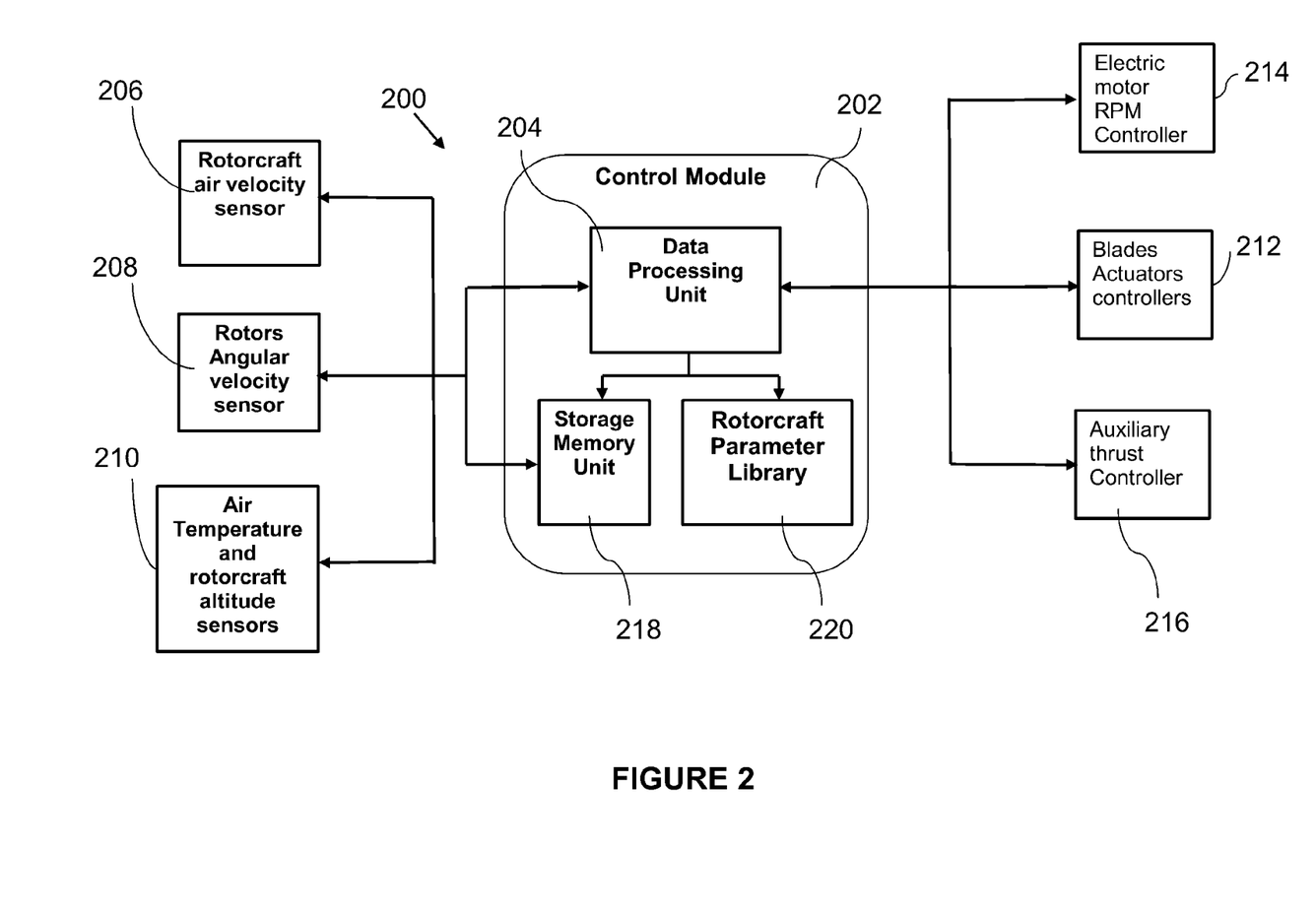
FIG. 2 is a schematic block diagram of the rotorcraft system in accordance with embodiments of the invention.

Referring now to FIG. 2, there is shown, a schematic block diagram 200 of the rotorcraft system. The diagram 200 shows the control module 202 in the centre. The control module 202 comprises a processing unit 204 connected to the plurality of sensors 206, 208, 210 via a high-velocity communication link. The processing unit 204 is also connected to the blade actuators controllers 212, the electric motor controller 214, and auxiliary thrust controller 216 through a high-velocity communication link.

The plurality of sensors is such that helicopter 100 air velocity, rotor hub angular velocity and environmental data such as air temperature, pressure and wind velocity, are continuously streamed to the control module 202 via the high-velocity communication bus and the processing unit so that data can be analysed, and control actuation signals can be sent to the electric motor(s) or the actuators in real time.

The control module 202 comprises a memory unit 218 operatively coupled to the processing unit 204. The memory unit comprises instructions suitable to generate, based on the helicopter 100 air velocity, rotor hub angular velocity and environmental data, at least one or more actuation signals to control the electric motor(s) or the actuators in a manner such that lift is maintained.

Static data which describe the physical attributes of the blade such as blade length as well as that of the rotorcraft are incorporated. Sensors which detect rotorcraft flight dynamics, flight control output from linkages or autopilot systems, rotor RPM, blade pitch angle, blade performance data and net resultant airflow will also be blended into the calculation. Atmospheric parameters such as density altitude can also be included. Data related to each specific rotorcraft can be accessed by the processing unit 204 through data libraries 220.

By knowing the net airflow across the blade derived from wind velocity and rotorcraft velocity, the processing unit calculates an RPM to maintain a tip velocity well below transonic velocities.

As the helicopter 100 accelerates, roughly the same airflow across is maintained over the advancing rotor blades by reducing the RPM of the rotors commensurate with the increasing net resultant airflow over the helicopter 100. This will eliminate high velocity effects on the advancing rotor blade.

Advance ratio (μ) provides a representative value of airflow over the retreating blade and is given by the formula $\mu = V_{Freestream}/\omega R$. Rotor blade radius is represented by R and ω (omega) is the rotor angular velocity given in radians per second. When μ=1 there is no airflow over that section of the blade. For any particular AOA, the reduction in velocity of the air over the retreating blade as the true air velocity increases will cause the blade section to move closer to the critical angle.

When the advance ratio exceeds 0.7 RBS can occur. The control module 202 calculates μ for the current blade AOA of the retreating blade. If μ moves above 0.5, a buffer amount below 0.7, the blade angle is reduced.

The frequency of the sampling will be determined by the length of the rotor blades. The shorter the blades the more often the calculation will be required A typical value for a 3 m rotor blade would be 10 Hz, once per revolution. Trend rate would be determined based on change of $V_{Freestream}$. If $\Delta V_{Freestream}$ is 0 no further calculation is required. If $V_{Freestream}$ is >0 and μ becomes higher than 0.5 a reduction of retreating blade angle will be applied. The amount of blade angle reduction will be proportional to $\Delta V_{Freestream}$. A small increase in $V_{Freestream}$, for example 20 kts, would require a 0.1 degree reduction in blade angle. A larger increase in $V_{Freestream}$, for example 50 kts, would require a 0.5 degree reduction in blade angle.

The control module 202 will then recalculate μ at the new AOA. If μ trends below 0.4, the blade angle will be progressively increased.

Advance ratio is then modified from $$\mu_1 = (V_{Freestream}/\omega R)$$

to $$\mu_2 = V_{Freestream}/\omega_{Nr\ reduction} R^* \text{(reduced blade angle factor)}$$

The combination of RPM reduction and advance ratio control in this fashion will eliminate both high velocity and RBS limitations ensuring the rotorcraft can accelerate well in excess of the velocity of any comparable conventional rotorcraft.

RPM is reduced as net airflow increases to maintain near constant airflow across all blades. The net rotorcraft lift L is given by summing the lift for each rotor blade:

$$L = (C_L \tfrac{1}{2} \rho V^2 S)_{Blade\ 1} + \ldots + (C_L \tfrac{1}{2} \rho V^2 S)_{Blade\ n}$$

When the rotorcraft velocity is zero:

$$L_{rotorcraft\ stationary} = C_L \tfrac{1}{2} \rho V^2_{rotorcraft\ stationary} S$$

As the rotorcraft accelerates the formulae become:

$$L_{rotorcraft\ moving} = C_L \tfrac{1}{2} \rho V^2_{rotorcraft\ moving} S \text{ and}$$
$$L_{Nr\ reduction} = C_L \tfrac{1}{2} \rho V^2_{Nr\ reduction} S$$

giving:

$$L_{Nr\ reduction} = L_{rotorcraft\ moving} - L_{rotorcraft\ stationary} \text{ or}$$
$$L_{Nr\ red'n} = L_{velocity>0} - L_{velocity} = 0$$

and subsequent $N_r$.

L is a calculus value determined by incrementally summing L for all blade sections. L can also be read from pre-determined blade property tables for the blade for any given blade AOA. $V_{Nr\ reduction}$ represents the relationship between $V_{rotorcraft\ moving}$ and $V_{rotorcraft\ stationary}$ Once L has been determined $V_{Nr\ reduction}$ is calculated. This process will generate the same value of net lift L regardless of rotorcraft velocity.

The value calculated can be instantaneously verified by control module 202. The control module 202 will sense vertical acceleration and should be zero once $V_{Nr\ reduction}$ has been applied. Buffers, bias and filters can be applied to ensure the granularity of the calculation is not so fine that excessive calculation beyond realistic and reasonable variations in air velocity occur.

Depending on the mission requirement and rotorcraft configuration the control module 202 can commence applying an RPM reduction to the rotors as soon as sensors detect helicopter movement, or once wind velocity over the helicopter is detected. Alternatively, the application of rotor hub RPM control can be delayed until the helicopter approaches its nominal limit velocity or at any velocity in between.

Approach to RBS can be further reduced or eliminated by reducing the AOA on the retreating blade as the rotorcraft accelerates. The control module 202 reduces the retreating blade angle toward zero to completely eliminate RBS. Given that L=CL ½ ρ V2 S and knowing the performance lift drag curve for the blade, the number of degrees of retreating blade angle reduction is readily calculated.

For the retreating blade:

$$\text{Blade Angle } (BA) = \text{Blade Angle Longitudinal} (BA_{Lon})$$
$$+ \text{Blade Angle Lateral } (BA_{Lat})$$
$$- \text{Blade Angle Reduction}_{retreating\ blade}$$

As velocity increases, un-stalling a blade can be achieved by driving the retreating blade to:

$$\text{Blade Angle } (BA) = 0$$

When reducing retreating blade angle, it may be appropriate to increase the lift on one or more advancing blades to maintain the same net lift.

Knowing the loss of lift from the lower value of V and the loss of $C_L$ for the retreating blade, the control module 202 will calculate the advancing blade angle change that will provide the same total L as was achieved prior to the RPM reduction and retreating blade angle reduction. Compensating lift is applied only to the advancing blades by increasing the AOA on those blades. The compensation would normally be applied to the alternate rotor disk advancing blades. This arrangement will keep the entire system balanced:

Lift Compensation=Lift lost from retreating blade due to AOA reduction+Lift lost from retreating blade due $N_r$ reduction+Lift lost from advancing blade due $N_r$ reduction.

For the advancing blade:

Blade Angle (BA)=Blade Angle Longitudinal ($BA_{Lon}$)+Blade Angle Lateral ($BA_{Lat}$)+Lift Compensation$_{advancing\ blade}$ Lift compensation for reduction in total lift of the retreating blades as retreating blade angle is reduced might also be achieved by holding $N_r$ slightly higher than the nominal value computed by control module 202.

Differential application of advancing blade AOA between the first and second rotor hub will enable pitch and roll control.

Vortex Ring State

Vortex ring state (VRS) occurs when a rotorcraft is at low velocity and tip vortices increase to the degree that lift is lost on the aerofoil. This state usually occurs when the rotorcraft is in a descent that increases the upflow of air through the rotor disks. A reduction of lift occurs as the tip vortices increase. This loss of lift is further amplified at the rotor hub as the low velocity of the blade combined with the increased upflow can cause that section of the blade to stall. As a result, the rotorcraft rate of descent will increase to a point where ground impact becomes inevitable.

It is assumed that the maximum all-up weight (AUW) to hover or descend and land will be limited by the power available and density altitude. When encountering VRS applying additional collective will increase the effect and there will only be a limited time before maximum power is demanded.

The system disclosed herein can mitigate or eliminate adverse aerodynamic flight vulnerabilities such as vortex ring state (VRS) and settling with power. A combination of dynamic RPM control in concert with IBC can change the airflow over the rotor blade once VRS is detected. A burst increase in RPM, significantly higher than the comparable lift capable of being generated by a conventional rotorcraft operating at low velocity, preceded by or combined with a reduction in blade pitch AOA will allow the rotorcraft to fly free of the VRS.

Once VRS is identified the control module 202 will use IBC to simultaneously decrease blade pitch angle and rapidly increase $N_r$ to generate additional short-term lift to fly clear of the VRS condition.

Longitudinal Cyclic Pitch Control:

To move the rotorcraft forward, the angle of the rotors is tilted downward. The greater the forward pitch demand is, the lower the blade angle. To achieve this, the maximum blade angle decrement is applied at a position some time before the position of maximum rotors tilt. This position is given by the advance angle.

Once the amount of pitch change required has been determined by measuring the cyclic longitudinal control displacement or obtaining an electronic value adjusted for phase lag, the maximum and minimum blade angle changes can be calculated.

To emulate a mechanical swashplate the control module 202 calculates the rise and fall values for the blade to smoothly transition from maximum to minimum blade disk changes at $\theta=0$ and $\theta=180$. Phase lag must also be considered.

The basic formula used is, For $\theta_0^{360}$:

Blade Angle Longitudinal ($BA_{Lon}$)=Blade Angle in hover ($BA_H$)−cos $\theta$*(Blade Angle $\theta^0$−Blade Angle $\theta^{Advance\ Angle}$)+Density Altitude (DA) compensation.

Note that for rotation clockwise use Blade Angle $\theta^0$−Blade Angle $\theta^{Advance\ Angle}$, for rotation anticlockwise use Blade Angle $\theta^0$+Blade Angle $\theta^{Advance\ Angle}$.

Note that Blade Angle $\theta^0$ will be less than Blade Angle in hover (BAH), i.e., a negative value for forward flight.

Note that Blade Angle $\theta^0$−Blade Angle $\theta^{Advance\ Angle}$ is the maximum blade angle deviation in the longitudinal sense for any and every revolution.

Blade Angle in hover ($BA_H$) is a pure Collective value.

Lateral Cyclic Roll Control:

To roll the rotorcraft, the angle of the rotor disk is tilted left or right. To achieve this the blade angle is decreased on the side the rotorcraft is rolling toward. Before considering phase lag, the lowest blade angle is at $\theta=90$. The highest blade angle will be at $\theta=270$.

The greater the roll demand is, the lower the blade angle will be.

The basic formula for lateral blade angle (roll) is, for $\theta_0^{360}$:

Blade Angle Lateral ($BA_{lat}$)=Blade Angle in hover ($BA_H$)−cos $\theta$(Blade Angle $\theta^{90}$−Blade Angle $\theta^{Advance\ Angle}$)+Density Altitude (DA) compensation Note that for rotation clockwise use Blade Angle $\theta^{90}$−Blade Angle $\theta^{Advance\ Angle}$, for rotation anticlockwise use Blade Angle $\theta^{270}$+Blade Angle $\theta^{Advance\ Angle}$.

Note that Blade Angle $\theta^{90}$−Blade Angle $\theta^{Advance\ Angle}$ is the maximum blade angle deviation in the lateral sense for any and every revolution.

Blade Angle in hover ($BA_H$) is a pure Collective value

Full cyclic control can be accomplished by adding longitudinal cyclic pitch control and lateral cyclic roll control:

Blade Angle (BA)=Blade Angle Longitudinal ($BA_{Lon}$)+Blade Angle Lateral ($Ba_{lata}$)

Figure 3:
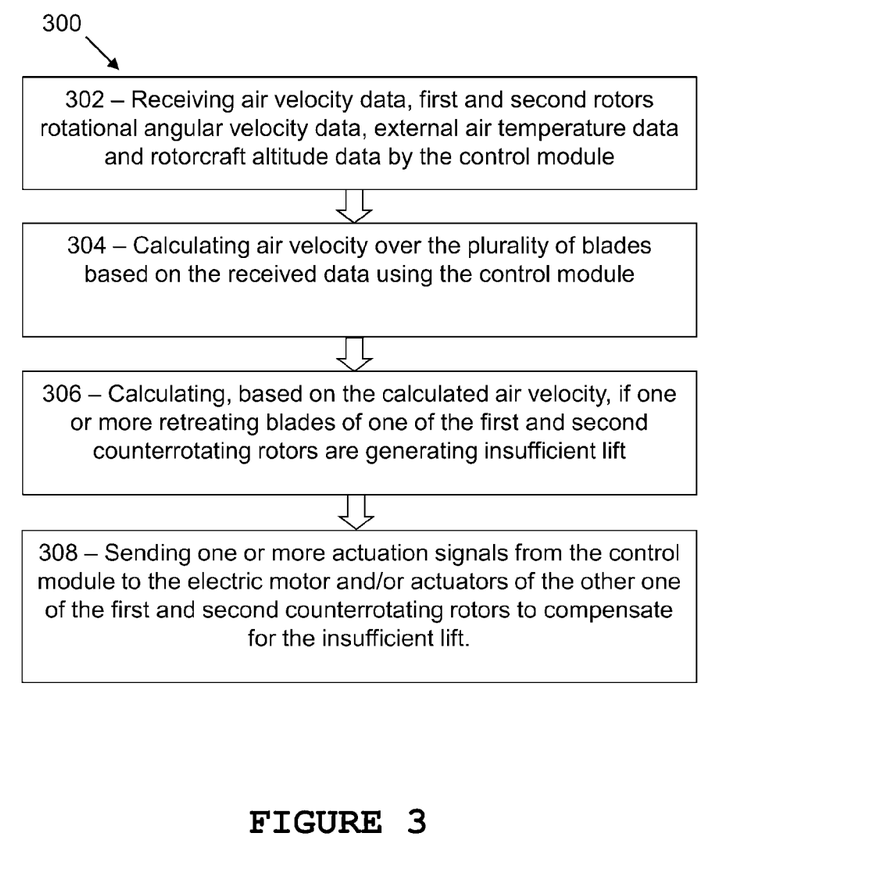
FIG. 3 is a flow diagram of a method for controlling a rotorcraft in accordance with embodiments of the invention.

FIG. 3 is a flow diagram 300 of a method for controlling a helicopter 100 using the system shown in FIG. 1. The first step (302) requires the control module to receive air velocity data, first and second rotors rotational angular velocity data, external air temperature data and rotorcraft altitude data by the control module. Subsequently, using the received data, the air velocity over the plurality of blades is calculated (304). This allows the control module to establish whether one or more retreating blades of one of the first and second counterrotating rotors are generating insufficient lift and to calculate the amount of insufficient lift based on the following equation (306):

$$E=L+[c\rho R(3u-v)(v^2-3vu+3u^2)/6(v-u)]$$

Finally, one or more actuation signals are sent from the control module to the electric motor and/or actuators of the other one of the first and second counterrotating rotors to compensate for the insufficient lift (308).

Flight conditions that can generate loss of lift include blade critical velocity or a rotorcraft lift imbalance. For example, the blade critical velocity condition may be an RBS velocity or an advancing blade supersonic airflow.

Detailed Analysis of Rotorcraft Lift

Figure 4A:
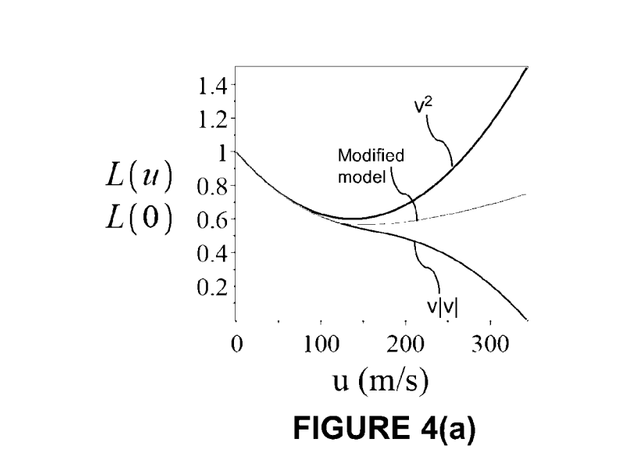
FIG. 4(a) shows the models producing similar average lifts for low forward velocity as the effect of dissymmetry of lift is at its lowest influence.
Figure 4B:
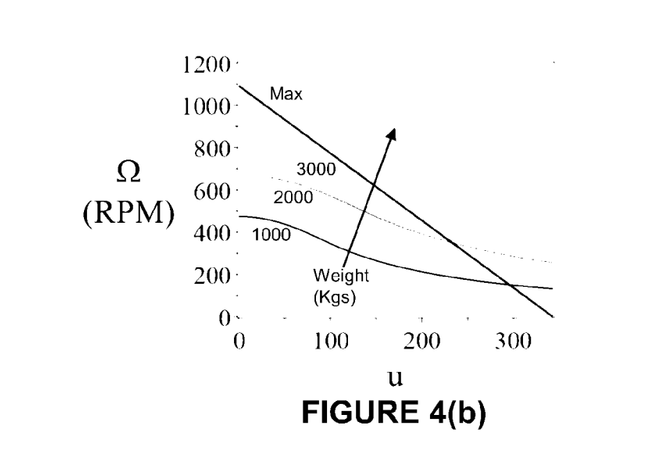
FIG. 4(b) shows plots of the minimum for various weights with the theoretical maximum against forward velocity.
Figure 4C:
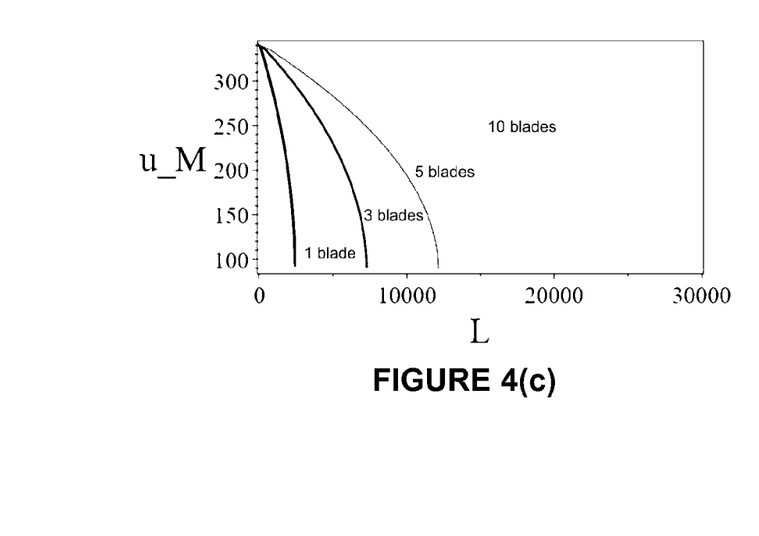
FIG. 4(c) shows the maximum speed against lift for several blade lengths.
Figure 4D:
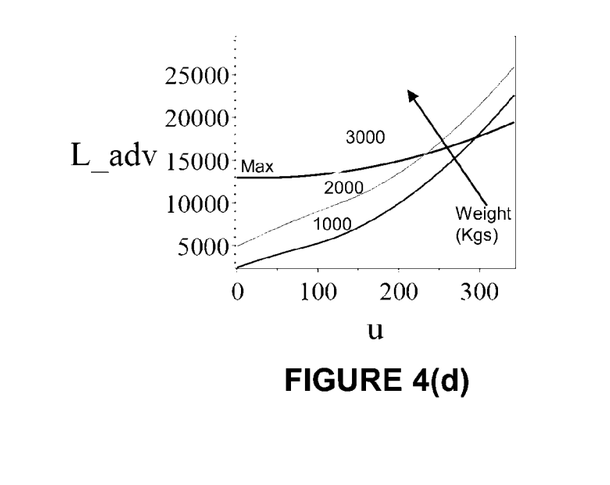
FIG. 4(d) shows a plot of the average lift over the advancing half of the helicopter rotor disk against forward velocity for the minimum values for required to maintain altitude for helicopters of different weights.
Figure 5A:
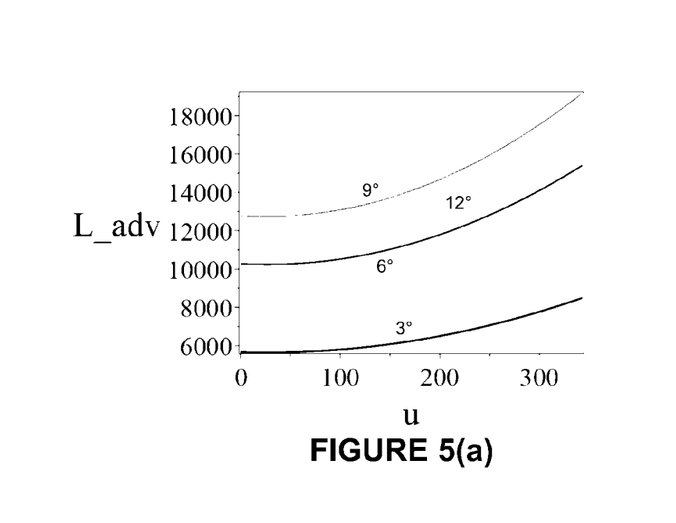
FIG. 5(a) shows the average lift over the advancing half of the helicopter rotor disk against forward velocity for several angles of attack.
Figure 5B:
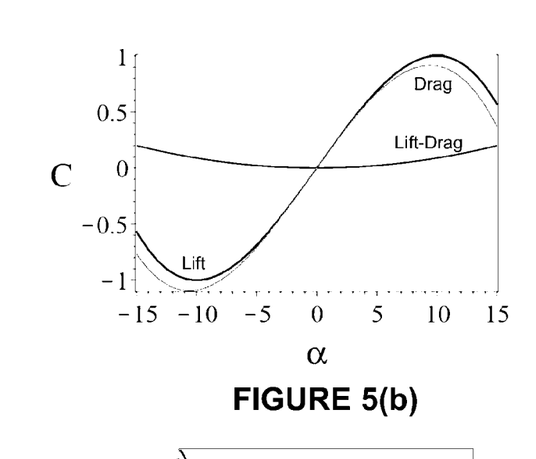
Figure 5C:
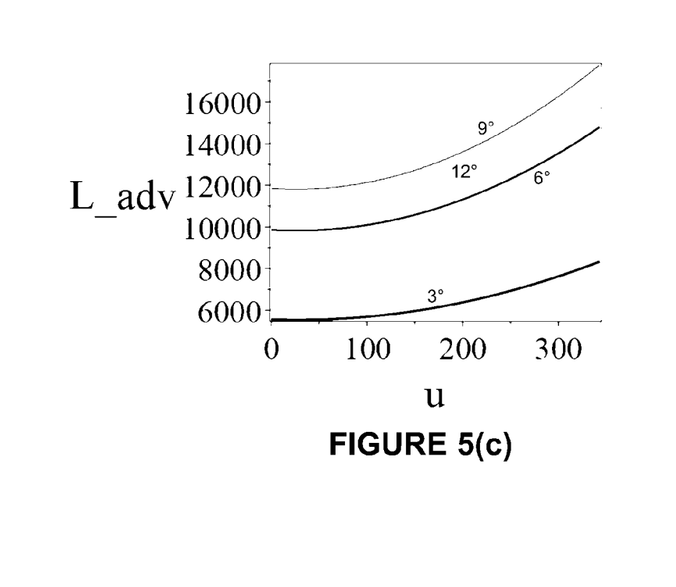
Figure 5D:
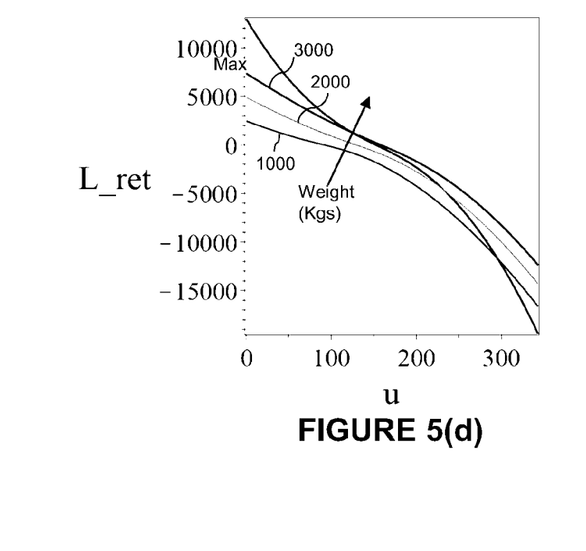
Figure 6A:
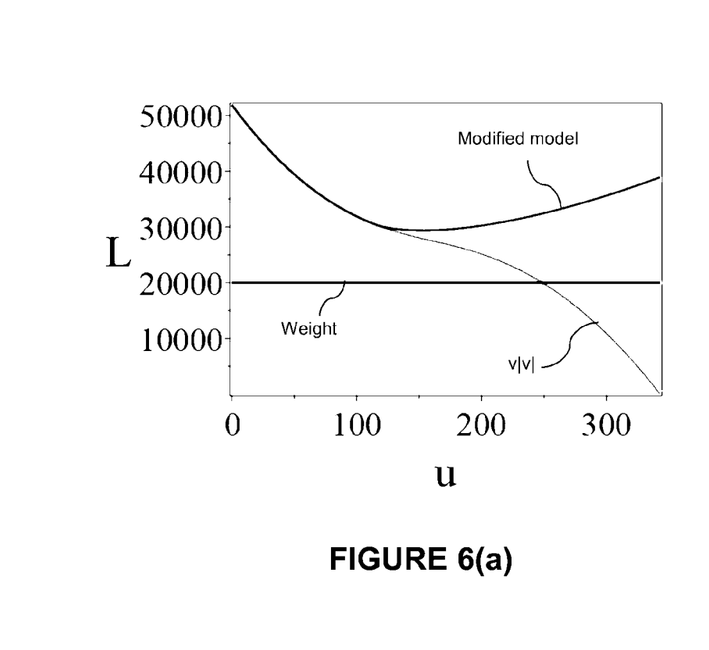
FIG. 6(a) shows that the advancing blade is capable of sustaining lift if the angle of attack can decrease lift on the retreating blades, as the lift on the advancing blade increases as forward velocity increases.
Figure 6B:
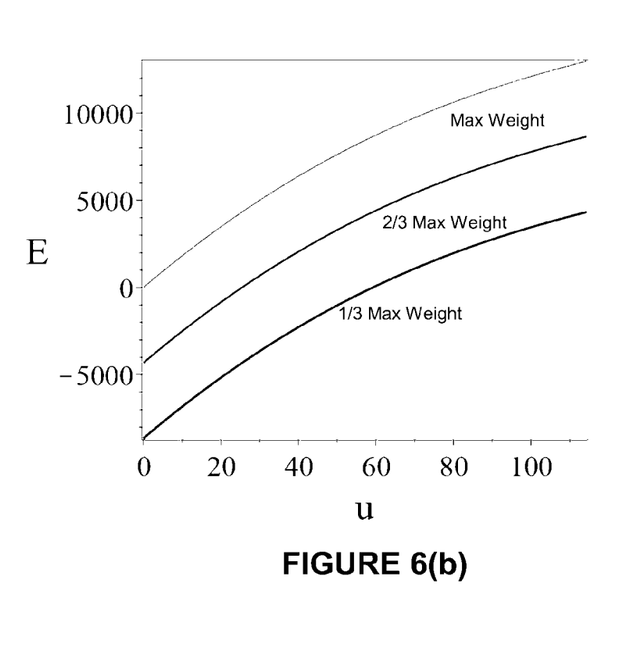
FIG. 6(b) shows a plot of the average lift over the retreating half of the helicopter rotor disk against forward velocity.

Referring now to FIGS. 4 to 6, there are shown a number of diagrams with lift and speed performance calculated using the standard and modified lift equation discussed in the sections above. These results do not account for any additional thruster, but just thrust generated by rotors.

Starting from the lift equations, since the helicopter rotor speed $\Omega$ is dependent on u, the time interval required to consider one revolution is also dependent on u. Therefore, for the standard lift equation the average value over one particular revolution with the alternative integral:

$$L_{std,T}(u) = \frac{1}{2\pi}\int_0^{2\pi}\int_0^R \frac{1}{2}\rho c\left(\frac{v-u}{R}r + u\cos(\theta)\right)^2 C_L dr d\theta.$$

$$L_{max,T} = \frac{1}{2\pi}\int_0^{2\pi}\int_0^R \max\left(\frac{1}{2}\rho c\left(\frac{v-u}{R}r + u\cos(\theta)\right)\left|\frac{v-u}{R}r + u\cos(\theta)\right|C_L, 0\right)dr d\theta.$$

u is the forward velocity of the rotorcraft,
c is the chord length of the blades,
$\theta$ is the Azimuth angle of the blade along the rotor disk ($\Omega t$),
$\rho$ is the air density,
R is the blade radius, r is a point along the blade,
v is the speed of the blade(s) tip of the rotors.

FIG. 4(a), shows that the models produce similar average lifts for low forward velocity as the effect of dissymmetry of lift is at its lowest influence. As the forward velocity increases, the lift produced by the blade decreases as the rotor speed must decrease. Once the negative lift is produced by the retreating blade at u=v/3 the lift from the standard and modified model diverge. The standard model increases lift as the forward velocity remains non-negative, this model does not take into account the RBS and therefore isn't realistic. However, The lift for the standard and modified model diverge.

For the modified model (center line), the overall lift decreases as the negative lift on the retreating blades counteract the positive lift produced by the advancing sides. If the angle of attack can be set to 0, the negative effect of the retreating blade diminishes, and the lost lift begins to recover. Since the retreating side of the rotor disk cannot produce any positive lift for velocities above 114.3 ms$^{-1}$, only coaxial helicopters are able to rectify the issue. We also note the lift produced in these velocities varies between 50%-75% of the lift generated in static hover. This is primarily a consequence of the decreased rotor speed as u increases.

FIG. 4(b) shows plots of the minimum for various weights with the theoretical maximum against forward velocity. The minimum threshold for $\Omega$ decreases as forward velocity u increases. While this allows the rotor disk to spin at a lower RPM, the maximum threshold imposed by Equation (1) decreases at a faster rate. The maximum speed limit is given by:

$$u_M(L) = \frac{v}{4} + \frac{\sqrt{3Rc\rho(3Rc\rho v^2 - 32L)}}{4Rc\rho}$$

FIG. 4(c) shows the maximum speed $u_M$ against lift L for several blade lengths. If the forward velocity of a helicopter should exceed this limit (if u>$u_M$), the rotor angular velocity must decrease and the lift produced will not be sufficient to maintain altitude. To compensate for this, other methods for producing lift will be necessary, such as wings or a modified fuselage shape.

FIG. 4(d) shows a plot of the average lift over the advancing half of the helicopter rotor disk against forward velocity for the minimum values for required to maintain altitude for 1000 kg, 2000 kg and 3000 kg helicopters. As the forward velocity increases it reaches the maximum allowable limit $u_M$, at which point the lift generated coincides with the lift obtained by the maximal rotor angular velocity.

FIG. 5(a) shows the average lift over the advancing half of the helicopter rotor disk against forward velocity for several angles of attack. Lower angles of attack predictably produce less lift up to the stall threshold AOA≅10°. When the angle of attack exceeds this limit, the lift begins to decrease, as expected with retreating blade stall.

The lift generated on the retreating side of the rotor disk can be calculated as:

$$L_{ret}(u) = \frac{1}{\pi}\int_{\frac{\pi}{2}}^{\frac{3\pi}{2}}\int_0^R \frac{1}{2}\rho c(\Omega r + u\cos(\theta))|\Omega r + u\cos(\theta)|dr d\theta$$

The retreating side continues to build negative lift as forward velocity increases. The Inventors found that, for coaxial helicopters, the lift increase from the advancing side is sufficient to compensate the lift loss on the retreating side so that improved speed performance can be achieved by active electronic control of RPM and AOA.

FIGS. 5(b) and 5(c) show the lift coefficient and the difference between lift and drag against angle of attack and the average lift over the advancing half of the helicopter rotor disk against forward velocity for several angles of attack.

Angle of Attack Considerations for Coaxial Helicopters

In this section, we relax this assumption to derive conditions on the coefficient of lift that will enable lift to be generated equally across the rotor disk. For low forward velocities, the following formula can be applied:

$$C_L(\theta) = \frac{L}{L_{std}(u, \theta)},$$

where $L_{std}(u;\theta)$ is the lift generated by the blade at forward velocity u and azimuth angle $\theta$ given by $$L_{std}(u, \theta) = \frac{\rho c}{6\Omega}[(\Omega R + u\cos(\theta))^2|\Omega R + u\cos(\theta)| - u^3\cos^2(\theta)|\cos(\theta)|]$$

This expression remains valid until the lift generated on the retreating blade is no longer capable of producing sufficient lift. That is, the first threshold is the forward velocity $u_1$ such that $$L_{std}(u_1,\pi)=L.$$

FIG. 5(d) shows the average lift over the retreating half of the helicopter rotor disk against forward velocity for different weights.

Assuming the rotor angular velocity is at its maximum as shown by equation (1), we may simplify the above equation to show $u_1$ satisfies $$u_1^3 - \frac{4}{3}vu_1^2 - \frac{2}{3}\left(v^2 + \frac{L}{\rho cR}\right)u_1 - \frac{v}{9}\left(v^2 - \frac{6L}{\rho cR}\right) = 0.$$

For velocities u>u1, the angle of attack on the retreating blades can be set to maximum and increase the angle of attack on the counterpart advancing blade to compensate the insufficient lift generation.

Lift Compensation for Retreating Blades

As the forward velocity u increases above the first threshold $u_1$ defined above, we must produce excess lift on the advancing blades to compensate the lack of lift produced on the retreating blades. Suppose each blade must generate L lift. If $u<u_1$, $L_{std}(u; \pi)<L$. Therefore, the excess lift E that the advancing blades must produce is given by:

$$E = L - L_{std}(u, \pi)$$

FIG. 6(a) shows that the advancing blade is capable of sustaining lift if the angle of attack can decrease lift on the retreating blades, as the lift on the advancing blade increases as forward velocity increases.

FIG. 6(b) shows a plot of the average lift over the retreating half of the helicopter rotor disk against forward velocity.

The lift compensation E that the advancing blade must produce for its counterpart retreating blade. The curves in FIG. 6(b) are proportional to the maximum lift produced with zero vertical velocity. The highest weight the rotorcraft may attain. Negative values indicate the retreating blade is producing sufficient lift and compensation is not necessary. As the forward velocity increases, the critical values E(u)=0 coincide with $u_1(L)$ are found.

The lift compensation required also increases up to the critical value v/3. Therefore, in the case that $u>u_1(L)$, the coefficient of lift will take the form:

$$C_L(\theta) = \begin{cases} \dfrac{2L - \min\left(\dfrac{L}{L_{std}(u, \theta+\pi)}, 1\right)L_{std}(u, \theta+\pi)}{L_{std}(u, \theta)} & \theta \in \left[0, \dfrac{\pi}{2}\right] \cup \left[\dfrac{3\pi}{2}, 2\pi\right] \\ \min\left(\dfrac{L}{L_{std}(u, \theta)}, 1\right) & \theta \in \left[\dfrac{\pi}{2}, \dfrac{3\pi}{2}\right] \end{cases}$$

Although the invention has been described with reference to a preferred embodiment, it will be appreciated by persons skilled in the art that the invention may be embodied in many other forms. It will be appreciated by persons skilled in the art that numerous variations and/or modifications may be made to the technology as shown in the specific embodiments without departing from the spirit or scope of technology as broadly described. The present embodiments are, therefore, to be considered in all respects as illustrative and not restrictive.

Throughout this specification, unless the context clearly requires otherwise, the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is solely for the purpose of providing a context for the present invention. It is not to be taken as an admission that any or all these matters form part of the prior art base or were common general knowledge in the field relevant to the present invention as it existed before the priority date of each claim of this specification.

The invention claimed is:

1. A coaxial rotorcraft system of a rotorcraft, the system comprising:
   first and second counter-rotating rotors, each having a plurality of blades for generating lift when rotating;
   one or more electronically controlled electric motors operatively coupled to the first and second rotors;
   a plurality of electronically controlled actuators, each actuator operatively coupled to one or more of the plurality of blades and arranged to control the angle of attack of the one or more of the plurality of blades;
   a plurality of sensors on-board the rotorcraft; and
   a control module arranged to:
      receive rotorcraft air velocity data,
      first and second rotors angular velocity data,
      external air temperature data and rotorcraft altitude data;
      calculate air velocity over the plurality of blades;
      continuously analyse the received data; and generate, based on the analysed data, one or more actuation signals to control the one or more electric motors and/or the actuators in a manner such that a predetermined lift is maintained when the plurality of blades are rotating,
      wherein the control module comprises a processing unit on-board the rotorcraft, the processing unit being connected to the plurality of sensors, the actuators and the electric motors via a high-speed communication link, and wherein the processing unit analyses the data and generates actuation signals which, in turn, are sent to the electric motors and/or the actuators in real-time.

2. The system of claim 1, comprising one or more rotor hubs, directly coupled to the one or more electronically controlled electric motors and the first and second rotors.

3. The system of claim 1, wherein the plurality of sensors are arranged to measure rotorcraft air velocity, first and second rotors angular velocity, external air temperature and rotorcraft altitude.

4. The system of claim 1, wherein the control module is arranged to calculate a value of lift deficiency E based on the formula:

$$E = L + [c\rho R(3u-v)(v^2-3vu+3u^2)/6(v-u)]$$

u is the forward velocity of the rotorcraft,
c is the chord length of the blades,
ρ is the air density,
R is the blade radius,
v is the speed of the blade(s) tip of the rotors.

5. The system of claim 1, wherein the one or more actuation signals control the one or more electric motors and/or the actuators in a manner such that thrust can be increased while lift is maintained.

6. The system of claim 1, wherein the angle of attack for each blade is controlled by one actuator operatively coupled to the blade.

7. The system of claim 1, comprising one or more auxiliary thrusters and the control module is further arranged to generate at least one or more actuation signals for the one or more auxiliary thrusters to maintain, increase or decrease thrust.

8. The system of claim 1, wherein the plurality of sensors is arranged so that rotorcraft air velocity data, first and second rotors angular velocity data, external air temperature data and rotorcraft altitude data are continuously streamed to the control module via the high-speed communication bus.

9. The system of claim 1, wherein the control module comprises a memory unit operatively coupled to the processing unit; the memory unit comprising instructions suitable to calculate air velocity over the plurality of blades, based on rotorcraft air velocity data and first and second rotors angular velocity data.

10. A method for controlling rotorcraft rotors of a rotorcraft system of a rotorcraft, the rotorcraft system comprising first and second counter-rotating rotors, each having a plurality of blades for generating lift when rotating, one or more electronically controlled electric motors operatively coupled to the first and second rotors and a plurality of electrically controlled actuators, each actuator operatively coupled to one or more of the plurality of blades and arranged to control the angle of attack of the one or more of the plurality of blades, and a plurality of sensors on-board the rotorcraft, the method comprising the steps of:
 receiving air velocity data, first and second rotors rotational angular velocity data, external air temperature data and rotorcraft altitude data from a control module of the rotorcraft system, the control module comprising a processing unit on-board the rotorcraft, the processing unit being connected to the plurality of sensors, actuators and electric motors of the rotorcraft system via a high-speed communication link;
 in real-time, using the processing unit to analyze the data by:
  calculating air velocity over the plurality of blades based on the received data;
  calculating, based on the calculated air velocity, if one or more retreating blades of one of the first and second counter-rotating rotors are generating, or will generate, insufficient lift; and
 in real-time, using the processing unit to generate and send one or more actuation signals from the control module to the electric motor and/or actuators of the other one of the first and second counterrotating rotors to compensate for or prevent insufficient lift.

11. The method of claim 10, wherein the flight condition includes a blade critical velocity, and the blade critical velocity is an advancing blade transonic or supersonic blade airflow velocity and the one or more actuation signals comprise a control signal sent to the one or more electric motors to reduce rotors angular velocity and prevent advancing blade transonic or supersonic blade airflow while maintaining lift.

12. The method of claim 10, further comprising the step of calculating a lift deficiency E based on the formula:

$$E = L + [c\rho R(3u-v)(v^2 - 3vu + 3u^2)/6(v-u)]$$

u is the forward velocity of the rotorcraft,
 c is the chord length of the blades,
 $\rho$ is the air density,
 R is the blade radius,
 v is the speed of the blade(s) tip of the rotors.

13. The method of claim 11, wherein the control signal sent to the one or more electric motors to reduce rotors angular velocity is such that the reduction of angular velocity is proportional to the rotorcraft velocity and net resultant airflow to limit the rotorcraft air velocity below a critical velocity ($M_{CRIT}$) in accordance with the following formula:

$$V_{Tip\ Velocity} + V_{Freestream} \approx \text{Constant}$$

where $V_{Freestream}$ is true airspeed in the direction of travel.

14. The method of claim 10, wherein the method further comprises:
 calculating a value of advance ratio for each blade in accordance with the following formula:

$$\mu = V_{Freestream}/\omega R$$

where $\omega$ is the rotor hub angular velocity, R is the blade length and $V_{Freestream}$ is true airspeed in the direction of travel, and
 monitoring the value of advance ratio and triggering a reduction of blade angle of attack prior to the advance ratio reaching 0.7.

15. The method of claim 10, wherein the flight condition includes a blade angle of attack at which, for a given air velocity, a retreating blade stalls and the method comprises reducing the blade angle of attack on the plurality of retreating blades in order to prevent the retreating blades from stalling.

16. The method of claim 10, comprising one or more of the following steps:
 (i) calculating the net rotorcraft lift (L) in accordance with the following formula:

$$L = (C_L \tfrac{1}{2} \rho V^2 S)_{Blade\ 1} + \ldots + (C_L \tfrac{1}{2} \rho V^2 S)_{Blade\ n}$$

(ii) calculating the rotor hub angular velocity in accordance with the following formula:

$$N_{r,Reduced} = N_r - V_{Freestream}/(2*\pi*R)/60$$

where $N_r$ = nominal angular velocity of the rotor hub, or
 (iii) calculating blade angle of attack in accordance with the following formula:

Blade Angle (BA) = Blade Angle Longitudinal ($BA_{Lon}$) + Blade Angle Lateral ($BA_{Lat}$) − Blade Angle Reduction$_{retreating\ blade}$.

17. The method of claim 10, comprising one or more of the following steps:
 (i) controlling the blade pitch of the plurality of blades coupled to the first and second rotors in a reciprocal manner when the rotorcraft is in translational lift,
 (ii) generating compensating control signals by increasing the angle of attack to the alternate advancing blades, thereby reducing lift imbalance,
 (iii) controlling the rotors angular velocity and angle of attack of advancing blades to provide lift compensation in accordance with the following formula:

$$\begin{aligned}
\text{Lift Compensation}_{Rotor\ 1} = &\ \text{Lift lost from retreating blade due to } AOA\ \text{reduction}_{Rotor\ 2} \\
&+ \text{Lift lost from retreating blade due } N_r\ \text{reduction}_{Rotor\ 2} \\
&+ \text{Lift lost from advancing blade due } N_r\ \text{reduction}_{Rotor\ 2}.
\end{aligned}$$

$$\begin{aligned}
\text{Lift Compensation}_{Rotor\ 2} = &\ \text{Lift lost from retreating blade due to } AOA\ \text{reduction}_{Rotor\ 1} \\
&+ \text{Lift lost from retreating blade due } N_r\ \text{reduction}_{Rotor\ 1} \\
&+ \text{Lift lost from advancing blade due } N_r\ \text{reduction}_{Rotor\ 1}.
\end{aligned}$$

$$\begin{aligned}
\text{Blade Angle } (BA)_{Rotor\ 1} = &\ \text{Blade Angle Longitudinal}\,(BA_{Lon}) \\
&+ \text{Blade Angle Lateral}\,(BA_{Lat}) \\
&+ \text{Lift Compensation}_{advancing\ blade\ Rotor\ 2}
\end{aligned}$$

-continued $$\text{Blade Angle } (BA)_{Rotor2} = \text{Blade Angle Longitudinal} (BA_{Lon})$$
$$+ \text{Blade Angle Lateral} (BA_{Lat})$$
$$+ \text{Lift Compensation}_{advancing\ blade\ Rotor1}$$

(iv) generating at least one or more actuation signals for one or more auxiliary thrusters to provide additional thrust to the rotorcraft,
(v) accessing a library of known physical attributes of the plurality of blades and the rotorcraft,
(vi) measuring or calculating wind velocity to calculate blade air velocity, or
(vii) detecting a vortex ring state condition and generating control signals directed to the one or more electric motors to provide a rapid increase in rotor angular velocity and control signals directed to the plurality of actuators to reduce blade angle of attack.

18. The method of claim 10, wherein the control signals are configured such that normal flight conditions are recovered in response to a detected vortex ring state condition by:
reducing blade angle of attack towards zero; and
rapidly increasing rotors angular velocity.

* * * * *